United States Patent
Lin et al.

(10) Patent No.: US 10,218,228 B2
(45) Date of Patent: Feb. 26, 2019

(54) DETECTING AN OBJECT ON A WIRELESS CHARGING DEVICE

(71) Applicant: Intel Corporation, Santa Clara, CA (US)

(72) Inventors: Xintian E. Lin, Mountain View, CA (US); Lei Shao, Sunnyvale, CA (US); Bolat Dinc, Santa Clara, CA (US); Kai Liu, Shanghai (CN); Sen Lin, Shanghai (CN); Qinghua Li, San Ramon, CA (US); Yongwei Wu, Shanghai (CN)

(73) Assignee: Intel Corporation, Santa Clara, CA (US)

( * ) Notice: Subject to any disclaimer, the term of this patent is extended or adjusted under 35 U.S.C. 154(b) by 292 days.

(21) Appl. No.: 15/200,868

(22) Filed: Jul. 1, 2016

(65) Prior Publication Data
US 2018/0006504 A1   Jan. 4, 2018

(51) Int. Cl.
*H01F 27/42*   (2006.01)
*H01F 37/00*   (2006.01)
(Continued)

(52) U.S. Cl.
CPC .............. *H02J 50/60* (2016.02); *H02J 7/025* (2013.01); *H02J 50/12* (2016.02); *H02J 50/80* (2016.02); *H04B 1/3827* (2013.01); *H04W 4/80* (2018.02)

(58) Field of Classification Search
CPC .. H02J 50/60; H02J 50/80; H02J 50/12; H02J 7/025; H04W 4/80; H04B 1/3827
See application file for complete search history.

(56) References Cited

U.S. PATENT DOCUMENTS

2009/0322158 A1\* 12/2009 Stevens ................... H02J 5/005
                                                                307/104
2012/0293007 A1   11/2012 Byun et al.
(Continued)

FOREIGN PATENT DOCUMENTS

WO    2015061178    4/2015

OTHER PUBLICATIONS

International Search Report and Written Opinion for PCT Application No. PCT/US2017/033921, dated Sep. 11, 2017, 11 pages.

*Primary Examiner* — Carlos D Amaya
(74) *Attorney, Agent, or Firm* — Eversheds Sutherland (US) LLP

(57) ABSTRACT

A power transmitting device is disclosed comprising: one or more coils; at least one memory that stores computer-executable instructions; and at least one processor configured to access the at least one memory. The at least one processor may be configured to execute the computer-executable instructions to: cause to send to a first device a first load measurement request at a first instance and a second load measurement request at a second instance. The computer-executable instructions may cause the processor to receive a first load measurement associated with the first load measurement request and a second load measurement associated with the second load measurement request. The computer-executable instructions may cause the processor to determine a first average measurement of the first load measurement and the second load measurement. The computer-executable instructions may cause the processor to send to a second device a third load measurement request at a third instance and a fourth load measurement request at a fourth instance. The computer-executable instructions may cause the processor to receive a third load measurement associated with the third load measurement request and a fourth load measurement associated with the fourth load
(Continued)

measurement request. The computer-executable instructions may cause the processor to determine a second average measurement of the third load measurement and the fourth load measurement. The computer-executable instructions may cause the processor to perform a load measurement of the one or more coils of the power transmitting device. The computer-executable instructions may cause the processor to determine a presence of one or more rogue devices based at least in part on a comparison of the load measurement and an aggregate of the first average measurement and the second average measurement.

12 Claims, 7 Drawing Sheets

(51) Int. Cl.
    *H01F 38/00*     (2006.01)
    *H02J 50/60*     (2016.01)
    *H02J 50/80*     (2016.01)
    *H02J 50/12*     (2016.01)
    *H04W 4/80*     (2018.01)
    *H02J 7/02*     (2016.01)
    *H04B 1/3827*     (2015.01)

(56) References Cited

U.S. PATENT DOCUMENTS

2014/0339907 A1   11/2014   Omae
2015/0333797 A1   11/2015   Nejatali et al.
2016/0028268 A1    1/2016   Fisher-Jeffes et al.

* cited by examiner

| Field | Octet | Description | Use | Units |
|---|---|---|---|---|
| Enables | 1 | PTU turn on, PTU on indication etc. | Mandatory | N/A |
| Permission | 1 | PRU is permitted in PTU. | Mandatory | N/A |
| Time Set | 1 | PTU sets up time. | Mandatory | ms |
| Timer value set for PTU/PRU time sync | 1 | PTU sets up timer value to enable PTU/PRU measurement time-sync | Mandatory | ms |
| RFU | 1 | Undefined | N/A | N/A |

FIG. 4

DETECTING AN OBJECT ON A WIRELESS CHARGING DEVICE

TECHNICAL FIELD

This disclosure generally relates to charging systems, and more particularly to detecting an object on a charging device.

BACKGROUND

Mobile devices have become an integral part of the computing landscape. As mobile devices become more capable, they have shifted to perform tasks that have been traditionally performed by non-mobile computers. In one example, mobile devices may have the ability to stream media, display videos, or otherwise process large amounts of data over the course of a day. The increasing use of mobile devices by consumers, along with the high dynamic range of power consumption across mobile devices, may cause certain components of a mobile device to wear down, such as the battery or power source. In some instances, certain applications of mobile devices may consume large portions of the battery powering the mobile device, resulting in a frequent need to charge the mobile device. Consumers may also have multiple mobile devices that may need to be charged, but may only have a limited amount of time to do so. Furthermore, depending on the number of devices a user needs to charge, the user may need as many electrical outlets as there are devices. Given the location of the electrical outlets, the user may have to charge the devices in locations that are not collocated, resulting in the user constantly having to get up to check the charge status of his or her devices.

BRIEF DESCRIPTION OF THE FIGURES

Reference will now be made to the accompanying drawings, which are not necessarily drawn to scale, and wherein:

FIG. 4 is an illustrative timer field, in accordance with example embodiments of the disclosure.

DETAILED DESCRIPTION OF EMBODIMENTS OF THE DISCLOSURE

Figure 1:
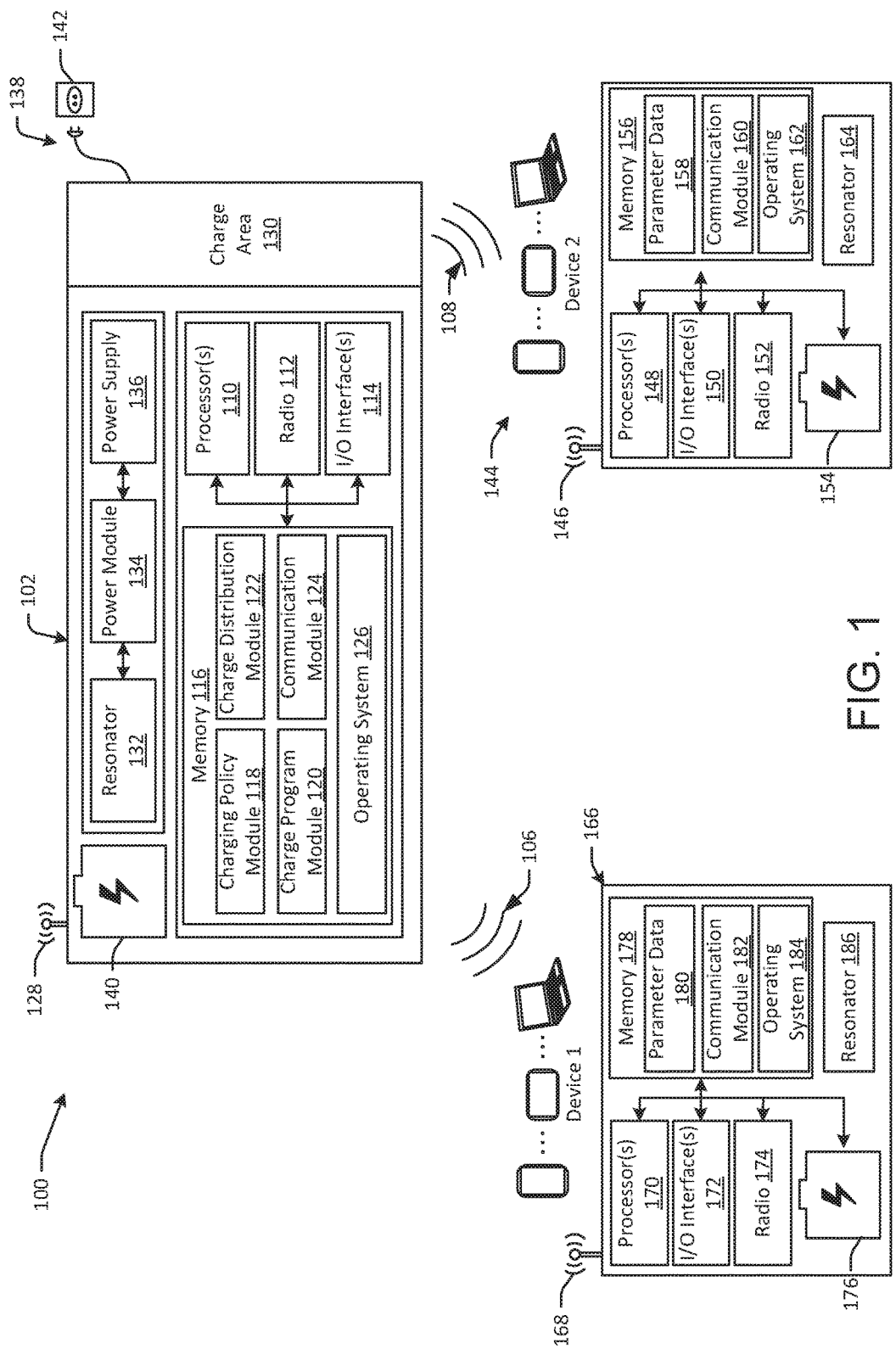
FIG. 1 is a block diagram of an example environment of a wireless charging system, in accordance with example embodiments of the disclosure.

The disclosure describes embodiments more fully hereinafter with reference to the accompanying drawings, in which example embodiments are disclosed. This disclosure may, however, be embodied in many different forms and should not be construed as limited to the example embodiments set forth herein; rather, these embodiments are provided so that this disclosure will be thorough and complete, and will fully convey the scope of the disclosure to those skilled in the art. Like numbers refer to like, but not necessarily the same or identical, elements throughout.

Recent developments in wireless charging technology enable a user to collocate multiple devices on, or near, a wireless charging station (e.g., a table surface with embedded wireless charging coils). In some embodiments, the wireless charging coils may be inductive power transmitting unit coils (PTU coils). Several wireless charging protocols exist (e.g., The Alliance for Wireless Power (A4WP) Rezence Baseline System Specification Version 1.2 (BSS V1.2), published Jul. 28, 2014) for wirelessly charging mobile devices. Although wireless charging stations provide users with the positional freedom to collocate different devices in a single area without having to worry about the number of available outlets, they do suffer from complications that traditional methods of charging (i.e., an electrical outlet) do not experience. For example, if an unregistered device is placed on top of the wireless charging station, existing wireless charging technologies will turn off the entire wireless charging station, thereby disabling power to all devices wirelessly connected to the wireless charging station. As a result, the user must remove the unregistered device before charging can resume. For example, a user may have a wireless charging station embedded in a table, and the user may place one or more non-chargeable objects (e.g., a hard drive, a DVD, a wallet, a keychain, a book, a pen, etc.) on the surface of the table along with a mobile phone. Existing wireless charging protocols may not charge the mobile phone while the non-chargeable objects are on the surface of the table, which may be undesirable and disruptive to the user's experience, as well as potentially introducing certain power inefficiencies.

Also, some devices may go through power cycles in which the power, voltage, current, or other measures of electric energy may vary over a short period of time thereby causing the wireless charging station to determine that the devices are not charging, because a non-chargeable object is interfering with the ability of the devices to charge. In other instances, the wireless charging station may determine, incorrectly, that the device is being moved in proximity of the wireless charging station and away from the wireless charging station thereby creating the power cycles.

Example embodiments of the disclosure may provide systems and methods for detecting a variation in the load experienced by an exemplary PTU that provides power to power receiving units (PRUs), such as wireless charging mobile devices, such as, but not limited to, mobile communication devices, laptops, smartphones, tablets, internet of things devices, such as appliances, wearables (including headsets, watches, health monitors, etc.), or other mobile devices. Example embodiments may include one or more PRUs electromagnetically coupled to a PTU. The PTU may be configured to wirelessly (e.g., electromagnetically) charge, or provide power defined as energy per unit time, to one or more connected PRUs. The PTU may be comprised of, among other things, one or more non-overlapping or partially overlapping coils, which in an illustrative embodiment may be PTU coils. The one or more non-overlapping or partially overlapping PTU coils may provide power to the one or more PRUs using the examples described herein, which include, but are not limited to, capacitive charging, inductive charging, and other wireless charging methods. The PTU may provide power to the one or more PRUs when the one or more PRUs are placed near one or more of the non-overlapping or partially overlapping PTU coils. The word "near" as used herein may refer to the infinite number of points between the furthest distance and the closest distance at which two or more non-overlapping or partially overlapping PTU coils on/in a PTU and one or more PTU coils on/in one or more PRUs may be magnetically coupled to one another. The closest distance may be a distance at which the one or more PTU coils on/in the PTU and the one or more coils on/in the PRUs are in direct contact with one another. The furthest distance may be a distance at which a magnetic field in the PTU coils of the PTU induces a magnetic flux in the coils of the PRUs sufficient to generate at least one electric charge in the coils of the PRUs. The magnetic field in the PTU coils of the PTU may be generated in response to a current passing through the PTU coils. A battery in the PTU may generate the current. Similarly, the furthest distance may be a distance at which a magnetic field in the coils of the PRUs induces a magnetic flux sufficient to generate at least one electric charge in the PTU coils. The magnetic field in the coils of the PRU may be generated in response to a current passing through the coils. A battery in each of the PRUs may generate the current.

The one or more PTU coils in the PTU and PRUs may be magnetically coupled to one another when a magnetic field is generated in the one or more PTU coils and induces a magnetic field and a corresponding current in the coils of the PRUs. The one or more PTU coils in the PTU and PRUs also may be magnetically coupled to one another when a magnetic field generated in the one or more coils in the PRUs induce a magnetic field and a corresponding current in the PTU coils of the PTU. The PTU may implement or otherwise include magnetic resonance technology to wirelessly charge, or distribute power to, connected PRUs. However, one or more interfering objects (e.g., a portable hard drive, a DVD, a wallet, or a keychain) may be positioned on one or more of the PTU coils thereby preventing a PRU, positioned on or near a covered coil, from being properly charged. Furthermore, the one or more objects could pose a safety risk to the user if the one or more interfering objects are comprised of flammable material that may be ignited by the magnetic resonance (or resulting heat) created by the one or more PTU coils in the PTU.

A PTU in accordance with the present disclosure may distinguish between the one or more PRUs and one or more interfering objects by using a wireless charging protocol. The wireless charging protocol may detect interfering objects and then turn off the PTU coils covered by the one or more interfering objects, and turn on and/or keep on the PTU coils covered by the PRUs. The wireless protocol described herein may charge multiple PRUs while providing users positional freedom to place their PRUs in any location on a charging surface of a PTU according to the present disclosure where there is an unoccupied coil. The wireless protocol is comprised of a scanning module and a charging module. The scanning module may detect the location of interfering objects and PRUs relative to one or more PTU coils in, or on, the PTU. The charging module may power off and power on the PTU coils, and in particular, power off the PTU coils covered by interfering devices when the scanning module determines which PTU coils have an interfering object proximate to it.

As mentioned above, when an interfering object is placed on top of a PTU with a single coil, the charging protocol may instruct the PTU to disable the entire PTU, which may be undesirable. The present disclosure describes systems, methods, and devices for managing the output power of a PTU having one or more non-overlapping or partially overlapping PTU coils, which use multiple charging PTU coils to increase the charging surface area over which the PRUs may be charged. The present disclosure also describes systems and methods for enabling a portion, or entire area of a surface area of a PTU, by selectively powering on one or more PTU coils that are closest to the PRU, and that provide the correct power requirements for the PRU. The present disclosure also describes systems and methods for disabling, or not turning on, a portion, or entire area of the surface area of a PTU, by scanning the PTU coils for interfering objects, and disabling the coil(s) with an interfering object covering the coil. If an interfering object is placed on the coil before a coil is activated, the PTU may scan the PTU coils, detect the interfering object, and then not enable the coil while an interfering object is covering it.

The PTU, or more specifically, a processor in the PTU may determine an amount of electrical energy delivered to one or more coils charging one or more PRUs. The processor may request electrical energy measurements from the one or more PRUs to determine if the amount of electrical energy delivered to the one or more coils is approximately equal to the amount of electrical energy consumed by the one or more PRUs as reported in the electrical energy measurements. The processor may send one or more out-of-band messages (e.g., Bluetooth Low Energy (BLE) communication messages) to the PRUs to synchronize the times at which the electrical energy measurements are being made between the PRUs and the determination of the amount of electrical energy being delivered to the one or more coils.

The above descriptions are for purposes of illustration and are not meant to be limiting. Numerous other examples, configurations, processes, etc., may exist, some of which are described in detail below. Example embodiments will now be described with reference to the accompanying figures.

Referring now to FIG. 1, FIG. 1 is a simplified schematic diagram illustrating an example wireless charging environment 100 in accordance with embodiments of the disclosure. FIG. 1 depicts a wireless charging device, that is, a PTU (e.g., PTU 102), a first mobile device, that is, a first PRU (e.g., PRU 166), a second mobile device, that is, a second PRU (e.g., PRU 144), and a charging policy configurator (not shown). This embodiment is merely illustrative, because any number of PRUs may be included. The PRU 166 and PRU 144 may be in wireless communication (e.g., out-of-band wireless communication) with the PTU 102 via wireless links 106 and 108 respectively. Specifically, the PRU 166 may be wirelessly connected to the PTU 102 via the wireless link 106. The PRU 144 may be wirelessly connected to the PTU 102 via the wireless link 108. In other embodiments of the present disclosure, additional or fewer PRUs may be included.

The PTU 102 may be any suitable device configured to wirelessly charge connected PRUs 166, 144. In some embodiments, the PTU 102 may incorporate, at least in part, a standardized charging protocol, such as that established by a standards body, such as the Alliance for Wireless Power (A4WP), or the AirFuel Alliance (AFA). In the illustrated embodiment, the PTU 102 may include one or more processor(s) (e.g., processor(s) 110), a wireless radio (e.g., radio 112), and one or more input/output (I/O) interfaces (e.g., I/O interface(s) 114). The processor(s) 110, the radio 112, and the I/O interface(s) 114 may be communicatively coupled to a memory (e.g., memory 116). Memory 116 may include a charging policy module (e.g., charging policy module 118), a charge program module (e.g., charge program module 120), a charge distribution module (e.g., charge distribution module 122), and a communication module (e.g., communication module 124). The charging policy module 118 may be configured to receive and/or store charging policies from a charging policy configurator (not shown). In some instances, the charging policy module 118 may be configured to receive charging policies and/or charging rules, as discussed herein, from a user of the PTU 102.

The charge program module 120 may be configured to determine charge programs for connected PRUs. The charge program module 120 may determine one or more charge programs based on one or more messages received wirelessly from one or more PRUs providing the voltage, current, power (real and/or reactive), power factor, status, and/or temperature rating of the one or more PRUs. The one or more messages may be received wirelessly at the PTU 102 via an antenna 128 and the radio 112 from one or more PRUs (e.g., an antenna 168 and a radio 174 of the PRU 166 and an antenna 146 and a radio 152 of the PRU 144). The radio 112 may receive the one or more messages using a bidirectional low power wireless communication protocol (e.g., Bluetooth Low Energy (BLE) protocol) operating on one or more frequencies in the 2.4 GHz band. In some embodiments, the one or more charge programs may be programs cached in the charging policy module 118 for the one or more PRUs previously charged by the PTU 102. In other embodiments, the charge program module 120 may determine that a charge program is unavailable for a PRU if the resonator 132, the power module 134, and the power supply 136 of the PTU 102 are unable to provide the voltage, current, power, and/or power factor within a given temperature rating to the PRU. For example, the resonator 132, the power module 134, and the power supply 136 may provide a predetermined voltage, current, power, and/or power factor within a predetermined temperature range that the PRU may determine it may not be able to use to charge its rechargeable power supply.

The charge distribution module 122 may be configured to control the distribution power to the PTU coils of the PTU 102, which then supplies power to the designated PRUs. The communication module 124 may be configured to transmit and/or receive wireless communications as described herein using a bidirectional low power wireless communication protocol (e.g., BLE protocol). The PTU 102 may include an operating system (operating system 126) in some embodiments. The operating system 126 may provide users with a guided user interface and/or may provide software logic used to control the PTU 102. In some embodiments, one or more of the modules stored on the memory 116 of the PTU 102 may be stored remotely, for example, at a remote server in the cloud. The remote server may be wirelessly connected to the PRUs and the PTU 102 in order to receive and/or transmit instructions.

The PTU 102 may include an antenna (e.g., antenna 128) in communication with a radio (e.g., radio 112). The PTU 102 may also include a resonator (e.g., resonator 132), power module (e.g., power module 134), and a power supply (e.g., power supply 136). The power module 134 may be electrically coupled to the power supply 136 and the resonator 132. The PTU 102 may be connected to an external power source 138 from which the PTU 102 may receive energy. In other embodiments, the PTU 102 may receive power from a solar cell and/or a piezoelectric device connected to the PTU 102. The PTU 102 may further include a battery (e.g., battery 140) or another energy storage device that may be configured to store power received from the external power source 138. Although each of these components is shown in the illustrated embodiment, other embodiments may include additional or fewer components. For example, the PTU 102 may include capacitive charging technology, contact ultrasound or non-contact ultrasound technology, infrared technology, or other wireless power distribution technologies. The PTU 102 may come in any shape, size, or form. For example, the PTU 102 may be in the form of, or include, a mat or a sheet, or may be integrated into furniture such as table or desktops, walls, airplane seats, chairs, armrests, electronic devices such as laptops or computers, or other surfaces adjacent to where the PRUs may be placed. The PTU 102 may have a designated physical location that provides charging to mobile devices positioned within the location, referred to herein as charge area 130. The charge area 130 may include one or more indicators, for example LED lights, indicating different charging locations across the charge area 130. In some embodiments, the one or more indicators may be color-coded, and in other embodiments they may provide location or connectivity information (e.g., one LED may be illuminated for each connected device to approximate the location where the coil charging each mobile device is located in the charge area 130) for a user.

The charge area 130 may comprise, among other things not depicted in FIG. 1, one or more non-overlapping PTU coils. The non-overlapping PTU coils may have a specific different or varying geometry. In some embodiments, a subset of the non-overlapping PTU coils may have a different geometry than the other non-overlapping PTU coils in the PTU. For example, if the shape and size of the charge area 130 is limited to certain dimensions, the shape of the PTU coils may differ in size and geometry to maximize the number of PTU coils provided by the PTU 120. The geometry of the PTU coils may also be based on the type of PRUs that may be charged on the PTU 102. For example, the geometry of a subset of the non-overlapping PTU coils may be circles, but the geometry of another subset of non-overlapping PTU coils may rectangular.

The PRUs 166 and 144 may be any device configured to execute one or more applications, software, and/or instructions to provide one or more services to a PTU. The PRUs 166 and 144, as used herein, may be any variety of client devices, electronic devices, communications devices, and/or other user devices. The PRUs 166 and 144 may include, but are not limited to, tablet computing devices, electronic book (ebook) readers, netbook computers, Ultrabooks™, notebook computers, laptop computers, desktop computers, watches or other wearables, health monitors, personal digital assistants (PDAs), smartphones, web-enabled televisions, video game consoles, set-top boxes (STB), or the like. While the drawings and/or specification may portray the PRUs 144, 166 in the likeness of a smartphone, tablet, or laptop computer, the disclosure is not limited to these devices. Indeed, the systems and methods described herein may apply to any PRU or user device capable of communicating with and/or receiving power from the PTU 102. The PRUs disclosed herein may be used by users for a variety of purposes including, but not limited to, functionality such as web browsing, business functions, communications, graphics, word processing, publishing, spreadsheets, databases, gaming, education, entertainment, media, project planning, engineering, drawing, or combinations thereof.

In the illustrated embodiment, the PRU 166 may include one or more processor(s) (e.g., processor(s) 170), an input/output (I/O) interface (e.g., I/O interface(s) 172), a radio (e.g., radio 174), and a battery (e.g., battery 176). The processor(s) 170, the I/O interface(s) 172, the radio 174, and the battery 176 may be communicatively coupled to a memory (e.g., memory 178). The PRU 166 may further include an antenna (e.g., antenna 168) in communication with the radio 174. Memory 178 may include an application providing charge parameter data (e.g., parameter data 180) to the charge program module 120. The parameter data 180 may include static parameter and dynamic parameter data. The static parameter data may include status data about the PRU 166. The dynamic parameter data may include voltage, current, power (real and/or reactive), power factor, and/or temperature data that may be used to charge the PRU 166. The processor(s) 170 may execute one or more computer-readable operating system (e.g., operating system 184) instructions to send the static parameter and dynamic parameter data using a communication module (e.g., communication module 182) to the charge program module 120 via the communication module 124. As explained above, the charge program module 120 may use static and dynamic data to determine a charge program for the PRU 166. The processor(s) 170, the I/O interface(s) 172, the radio 174, the communication module 182, the operating system 184, the resonator 186, and the battery 176 may perform one or more of the same functions as the processor(s) 110, the I/O interface(s) 114, the radio 112, the communication module 124, the operating system 126, the resonator 132, and the battery 140 of the PTU 102. The processor(s) 170, the I/O interface(s) 172, the radio 174, the communication module 182, the operating system 184, the resonator 186, and the battery 176 may also perform one or more functions not performed by the processor(s) 110, the I/O interface(s) 114, the radio 112, the communication module 124, the operating system 126, the resonator 132, and the battery 140. The operating system 184 may provide users with a guided user interface and/or may provide software logic used to control the PRU 166. The resonator 186 may be configured to receive resonant magnetic inductive energy wirelessly from the resonator 132 of the PTU 102, and may be further configured to charge the battery 176, as described herein. Although each of these components is shown in the illustrated embodiment, other embodiments may include additional or fewer components. In other embodiments, the PRU 166 may include components necessary to receive and store other forms of wirelessly communicated energy, such as capacitive charging.

Similarly, the PRU 144 may include one or more processor(s) (e.g., processor(s) 148, an input/output (I/O) interface (e.g., I/O interface(s) 150, a radio (e.g., radio 152), and a battery (e.g., battery 154). The processor(s) 148, the I/O interface(s) 150, the radio 152, and the battery 154 may be communicatively coupled to a memory 156. The PRU 144 may further include an antenna (e.g., antenna 146) in communication with the radio 152. Memory 156 may include an application providing charge parameter data (e.g., parameter data 158) to the charge program module 120. The parameter data 158 may include static parameter and dynamic parameter data. The static parameter data may include status data about the PRU 144. The dynamic parameter data may include voltage, current, power (real and/or reactive), power factor, and/or temperature data that may be used by the PTU 102 to charge the PRU 144. The processor(s) 148 may execute one or more computer-readable operating system (e.g., operating system 162) instructions to send the static parameter and dynamic parameter data using a communication module (e.g., communication module 160) to the charge program module 120 via the communication module 124. As explained above, the charge program module 120 may use static and dynamic data to determine a charge program for the PRU 144. The processor(s) 148, the I/O interface(s) 150, the radio 152, the communication module 160, the operating system 162, the resonator 164, and the battery 154 may perform one or more of the same functions as the processor(s) 110, the I/O interface(s) 114, the radio 112, the communication module 124, the operating system 126, the resonator 132, and the battery 140 of the PTU 102. The processor(s) 148, the I/O interface(s) 150, the radio 152, the communication module 160, the operating system 162, the resonator 164, and the battery 154 may also perform one or more functions not performed by the processor(s) 110, the I/O interface(s) 114, the radio 112, the communication module 124, the operating system 126, the resonator 132, and the battery 140. The operating system 162 may provide users with a guided user interface and/or may provide software logic used to control the PRU 144. The PRU 144 may also include a resonator 164 configured to receive resonant magnetic inductive energy wirelessly from the PTU 102, and may be further configured to charge the battery 154, as described herein. Although each of these components is shown in the illustrated embodiment, other embodiments may include additional or fewer components. In other embodiments, the PRU 144 may include components necessary to receive and store other forms of wirelessly communicated energy, such as capacitive charging.

The charging policy configurator may be any suitable electronic device, interface, or application configured to allow PTU users to create, implement, or otherwise modify charging policies and/or charging rules as described herein. The charging policy configurator may be remote or local to the PTU 102 and may be accessible by any PTU user, or access may be restricted to certain personnel such as employees or paying customers. In one embodiment, the charging policy configurator may be a remote computer managed by an information technology manager, while in other embodiments, the charging policy configurator may be included in the memory 116 of the PTU 102. The charging policy configurator may include a user interface and/or an operating system configured to allow users to configure and/or customize aspects of the PTU 102. For example, the charging policy configurator may determine and set charging rules, priority levels or ranks, and/or charging policies or make other modifications to the PTU 102. The charging policy configurator may include hardware suitable to facilitate communication with, for example, the PTU 102 via the charging policy module 118. Changes made to the charging policies at the charging policy configurator may be pushed to the PTU 102, or the charging policy module 118 of the PTU 102 may periodically request updates from the charging policy configurator. The charging policy configurator may include memory, on which the operating system, as well as a communication module and the charge policy configuration module, are stored. The charging policy configurator may also include one or more processors, input/output (I/O) interfaces, radios, and antennas.

The processors 110, 170, and 148 may be implemented as appropriate in hardware, software, firmware, or combinations thereof. Software or firmware implementations of the processors 110, 170, and 148 may include computer-executable or machine-executable instructions written in any suitable programming language to perform the various functions described. Hardware implementations of the processors 110, 170, 148 may be configured to execute computer-executable or machine-executable instructions to perform the various functions described. The processors 110, 170, 148 may include, without limitation, a central processing unit (CPU), a digital signal processor (DSP), a reduced instruction set computer (RISC), a complex instruction set computer (CISC), a microprocessor, a microcontroller, a field programmable gate array (FPGA), or any combination thereof. The PTU 102 and/or the PRUs 166 and/or 144 may also include a chipset (not shown) for controlling communications between one or more of the processors 110, 170, 148 and one or more of the other components of the PTU 102 or the PRUs 166 and 144. The processors 110, 170, and 148 may also include one or more application specific integrated circuits (ASICs) or application specific standard products (ASSPs) for handling specific data processing functions or tasks. In certain example embodiments, the PTU 102 and/or the PRUs 166 and 144 may be based on an Intel® Architecture system, and the processors 110, 170, 148 and chipsets may be from a family of Intel® processors and chipsets, such as the Intel® Atom® processor family.

The I/O interface(s) 114, 172, 150 included in the PTU 102 and the PRUs 166 and 144, respectively, may enable the use of one or more user interfaces for receiving user input and/or providing output to the user. A user may be able to administer or manage the systems and methods disclosed herein by interacting with the PTU 102 or the PRUs 166 and 144 via the I/O interfaces 114, 172, 150, such as a touchscreen interface, a display, a guided user interface, or any other input/output interface. The I/O interfaces 114, 172, 150 may be in the form of a touch screen, a microphone, an accelerometer sensor, a speaker, or any other suitable I/O interfaces that may be used by the user to interact with the PTU 102 or the PRUs 166 and 144.

The memory 116 of the PTU 102, as well as the memory 178 and 156 of the PRU 166 and the second PRU 144, respectively, may include one or more volatile and/or non-volatile memory devices including, but not limited to, magnetic storage devices, read-only memory (ROM), random access memory (RAM), dynamic RAM (DRAM), static RAM (SRAM), synchronous dynamic RAM (SDRAM), double data rate (DDR) SDRAM (DDR-SDRAM), RAMBUS DRAM (RDRAM), flash memory devices, electrically erasable programmable read-only memory (EEPROM), non-volatile RAM (NVRAM), universal serial bus (USB) removable memory, or combinations thereof.

The memory 116 of the PTU 102, as well as the memory 178 and 156 of the PRU 166 and the second PRU 144, respectively, may store program instructions that are loadable and executable on each respective processor 110, 170, 148, as well as data generated or received during the execution of these programs. Each memory 116, 178, and 156 may include several modules. Each of the modules and/or software may provide functionality for the PTU 102 or the PRUs 166 and 144 when executed by the processors 110, 170, and 148. The modules and/or the software may or may not correspond to physical locations and/or addresses in each memory 116, 178, and 156. In other words, the contents of each of the modules may not be segregated from each other and may, in fact, be stored in at least partially interleaved positions on each memory 116, 178, and 156.

The memory 116, 178, and 156 of the PTU 102, the PRU 166, and the PRU 144, respectively, may include operating systems 126, 184, and 162. The processors 110, 170, and 148 of the PTU 102 or the corresponding PRUs 166 and 144 may each be configured to access and execute one or more operating systems stored in the respective operating systems 126, 184, and 162 to operate the system functions of the electronic device. System functions, as managed by the operating system, may include memory management, processor resource management, driver management, application software management, system configuration, and the like. The operating system may be any variety of suitable operating systems including, but not limited to, Google® Android®, Microsoft® Windows®, Microsoft® Windows® Server®, Linux, Apple® OS-X®, or the like.

The memory 116, 178, and 156 of the PTU 102, the PRU 166, and the PRU 144 may include a communication module 124, 182, and 160, respectively. Each communication module 124, 182, and 160 may contain instructions and/or applications thereon that may be executed by each respective processor 110, 170, and 148 to provide one or more functionalities associated with the directional distribution and reception of wireless signals and task processing. These instructions and/or applications may, in certain aspects, interact with each respective operating system 126, 184, and 162 and/or other modules of the PTU 102 and/or the PRUs 166 and 144. Each communication module 124, 182, and 160 may have instructions, software, and/or code stored thereon that may be launched and/or executed by the processors 110, 170, and 148 to execute one or more applications and functionality associated therewith. These applications may include, but are not limited to, functionality such as web browsing, business, communications, graphics, word processing, publishing, spreadsheets, databases, gaming, education, entertainment, media, project planning, engineering, drawing, or combinations thereof.

The radios 112, 174, and 152 of the PTU 102 and/or the PRUs 166 and 144 may be a transmit/receive component, such as a transceiver. The radios 112, 174, and 152 may include any suitable radio(s) and/or transceiver(s) for transmitting and/or receiving radio frequency (RF) signals in the bandwidth and/or channels corresponding to the communications protocols utilized by the PRUs 166 and 144 to communicate with each other or with other user devices and/or the PTU 102 or another component of the PTU 102. The radios 112, 174, and 152 may include hardware and/or software to modulate communications signals according to pre-established distribution protocols. The radios 112, 174, and 152 may further have hardware and/or software instructions to communicate via one or more Wi-Fi and/or Wi-Fi direct protocols, as standardized by the Institute of Electrical and Electronics Engineers (IEEE) 802.11 standards. In certain embodiments, the radios 112, 174, 152, in cooperation with their respective antennas 128, 168, and 146 may be configured to communicate via 2.4 GHz channels (e.g. 802.11b, 802.11g, 802.11n), 5 GHz channels (e.g. 802.11n, 802.11ac), or 60 GHz channels (e.g. 802.11ad). In alternative embodiments, non-Wi-Fi protocols may be used for communications between the PTU 102 and/or the PRUs 166 and 144, such as BLUETOOTH™, BLUETOOTH™ LE, near field communication, dedicated short-range communication (DSRC), or other packetized radio communications. The radios 112, 174, and 152 may include any known receiver and baseband suitable for communicating via the communications protocols of the PTU 102 and/or the PRUs 166 and 144. The radios 112, 174 and 152 may further include a low noise amplifier (LNA), additional signal amplifiers, an analog-to-digital (A/D) converter, one or more buffers, and a digital baseband.

The antennas 128, 168, and 146 included in the PTU 102 and the respective PRUs 166 and 144 may be configured for receiving and/or transmitting communications signals from/to each other or other components of the PTU 102. The antennas 128, 168, and 146 may be any suitable type of antenna corresponding to the communications protocols used by the PTU 102 and/or the PRUs 166, and 144 for the particular signals received and/or transmitted via the antennas 128, 168, and 146. Some non-limiting examples of suitable antennas 128, 168, and 146 may include directional antennas, non-directional antennas, dipole antennas, folded dipole antennas, patch antennas, multiple-input multiple-output (MIMO) antennas, or the like. Each antenna 128, 168, and 146 may be communicatively coupled to a radio component to transmit and/or receive signals, such as communications signals to and/or from the PTU 102 and/or the PRUs the 166 and 144.

The antennas 128, 168, and 146 may be configured to receive and/or transmit signals in accordance with established standards and protocols, such as the Institute of Electrical and Electronics Engineers (IEEE) 802.11 family of standards, including via 2.4 GHz channels (e.g., 802.11b, 802.11g, 802.11n), 5 GHz channels (e.g., 802.11n, 802.11ac), or 60 GHz channels (e.g., 802.11ad). In alternative example embodiments, the antennas 128, 168, and 146 may be configured to receive and/or transmit non-Wi-Fi protocol signals, such as BLUETOOTH™, BLUETOOTH™ LE, near field communication, dedicated short-range communication (DSRC), or other packetized radio communications.

The PRUs 166 and 144, as well as the PTU 102, may include an energy storage device, such as batteries 140, 176, and 154. Each battery 140, 176, and 154 may be configured to provide energy or otherwise power to each respective PRU 166 and PRU 144. Batteries 140, 176, and 154 may be any suitable type of battery including, but not limited to, wet cells, dry cells, lead-acid, lithium, lithium hydride, lithium ion, or the like, at any suitable voltage and/or output current. In certain embodiments, the batteries 140, 176, and 154 may be rechargeable and may be recharged by one or more other power sources, such as the PTU 102. Each battery 140, 176, and 154 may be configured to receive and store energy.

The PTU 102 and each PRU 166 and 144 may include a respective resonator 132, 186, and 164. Each resonator 132, 186, and 164 may be any suitable resonator configured to provide, distribute, transmit, or receive energy. For example, the resonator 132 may be configured to transmit, emit, or otherwise transfer energy wirelessly, and the resonators 186 and 164 may be configured to receive energy transmitted by the resonator 132. The resonators 132, 186, and 164 may be electromagnetic resonators in one example. The resonators 186 and 164 may be electrically coupled to each respective battery 176 and 154 of the PRUs 166 and 144, and may be configured to charge, recharge, and/or provide energy to the batteries 176 and 154. Other wireless charging technologies, including infrared (IR), capacitive, or other technologies may be incorporated into the PTU 102.

The PTU 102 may include a power module 134 and a power supply 136. The power module 134 and the power supply 136 may be electrically coupled to the resonator 132, and may energize that resonator 132 such that the resonator 132 may wirelessly transfer power. The power supply 136 may be a battery, for example battery 140, and/or may be a connection to the external power source 138. The power supply 136 may further include AC/DC power conversion capabilities and/or converters. The external power source 138 may be power provided from a power outlet 142, as shown. The connection between the PTU 102 and the external power supply 138 may be a standard wall outlet, a universal serial bus connection, a FIREWIRE™ or LIGHTNING™ connection, or any other connection configured to deliver power to the PTU 102. In some embodiments, the power supply 136 may be an intermediary between the PTU 102 and the external power supply 138. The power module 134 may amplify energy from the power supply 136 to ensure the resonator 132 has sufficient energy to wirelessly transmit or distribute energy. For example, the power module 134 may provide current to the resonator 132, which may comprise one or more PTU coils capable of generating a magnetic field that may in turn generate a magnetic flux in one or more coils in a device, thereby inducing an electromotive force (i.e., voltage) and corresponding current in the device.

Figure 2:
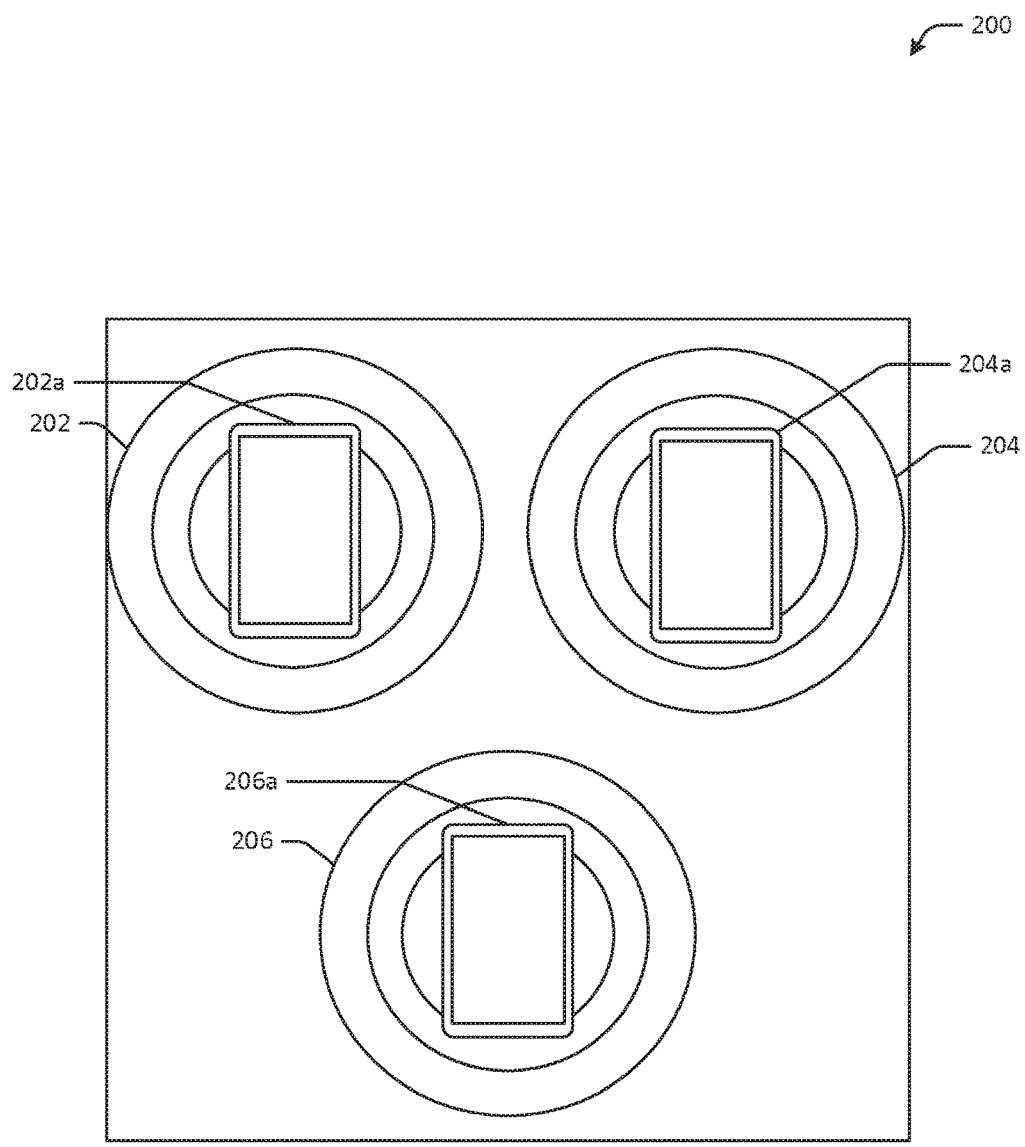
FIG. 2 is an illustrative diagram of an example environment of a power transmitting unit (PTU), in accordance with example embodiments of the disclosure.

FIG. 2 is an illustrative diagram of an example environment of a PTU, in accordance with example embodiments of the disclosure. The PTU 200 may comprise, among other things not depicted in FIG. 2, three non-overlapping coils, for example, coils 202, 204, and 206. The non-overlapping coils may have a specific geometry different from the geometry illustrated in FIG. 2. In some embodiments, a subset of the non-overlapping coils on the PTU 200 may have a different geometry than the other non-overlapping coils in the PTU 200. For example, if the shape and size of the PTU is limited to certain dimensions, the shape of the coils may differ in size and geometry to maximize the number of coils that may be provided by the PTU 200. The geometry of the coils may also be based on the type of PRUs that can be charged on the PTU 200. For example, the geometry of the non-overlapping coils 206 and 202 may be circular, but the geometry of non-overlapping coil 204 may be rectangular.

If the non-overlapping coil 204 has an object positioned over or partially over it, then the non-overlapping coil 204 may detect the object using the systems and methods disclosed herein. The object may be a properly implemented wireless charging enabled device (e.g., mobile phone 204a), or it may be an interfering object (e.g., a compact disc (CD) or digital video disc (DVD)). The PTU 200 may determine if the object is an interfering object by performing a rogue object detection (ROD) calculation as detailed below. The ROD calculation may be performed by a processor in the PTU 200 to determine a first voltage, current, and/or power measurements at the non-overlapping coils and to receive a second voltage, current, and/or power measurements from the mobile phones 202a, 204a, and 206a and compare the first and second voltage, current, and/or power measurements. The processor may determine if an interfering object is on a non-overlapping coil based at least in part on the comparison. Mobile phones 202a, 204a, and 206a may comprise a processor (i.e., processor(s) 170), an input/output (I/O) interface (i.e., I/O interface(s) 172), a radio (i.e., radio 174), a memory (i.e., memory 178), a battery (i.e., battery 176), a resonator (i.e., resonator 186), parameter data associated with the mobile phone 202a (i.e., parameter data 180), communication data associated with the mobile phone 202a (i.e., communication module 182), an operating system (i.e., operating system 184), and an antenna (i.e., antenna 168). The mobile phone 206a may comprise a processor (i.e., processor(s) 148), an input/output (I/O) interface (i.e., I/O interface(s) 150), a radio (i.e., radio 152), a memory (i.e., memory 156), a battery (i.e., battery 154), a resonator (i.e., resonator 164), parameter data associated with the mobile phone 206a (i.e., parameter data 158), communication data associated with the mobile phone 206a (i.e., communication module 160), an operating system (i.e., operating system 162), and an antenna (i.e., antenna 146).

Figure 3:
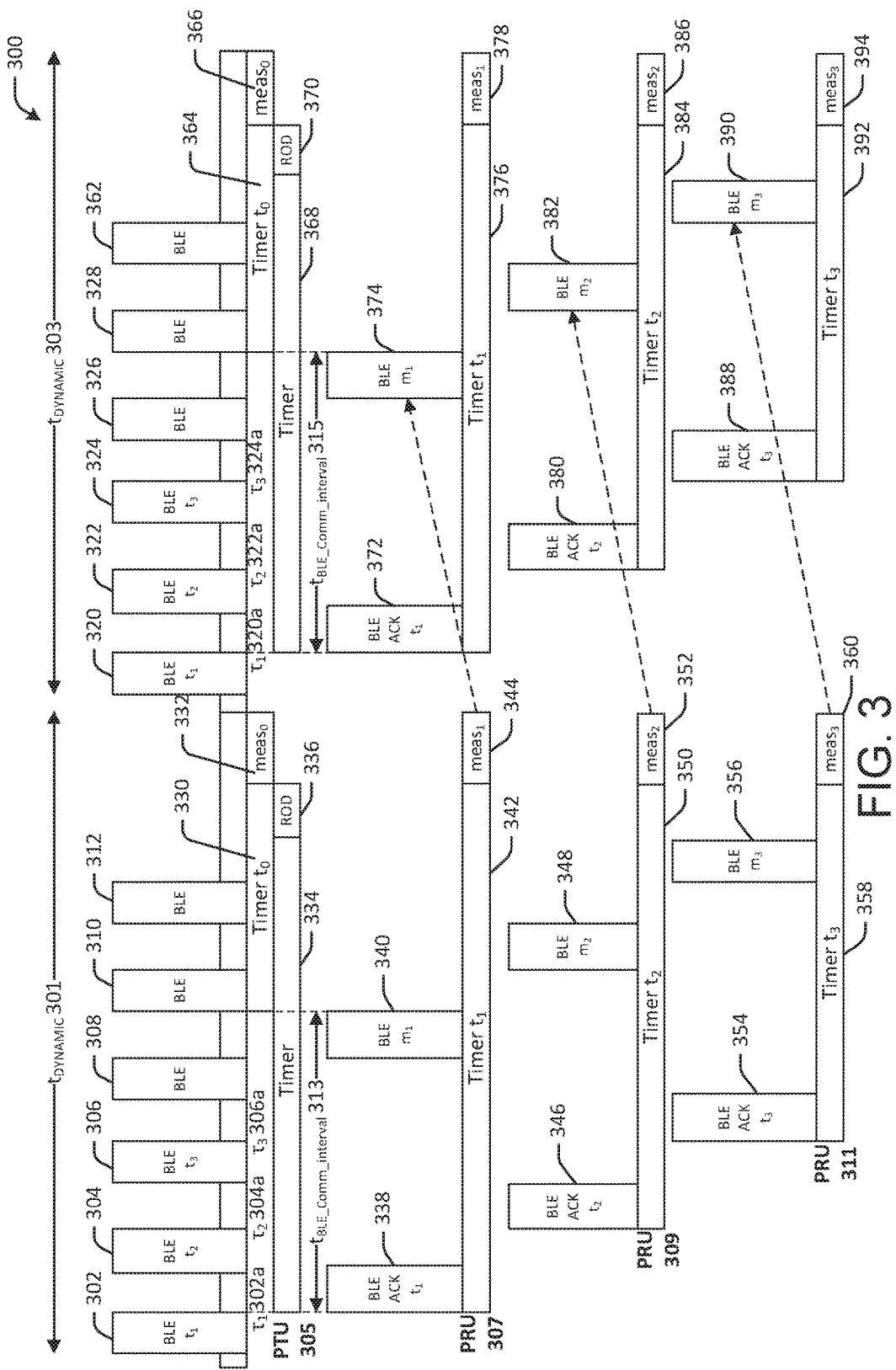
FIG. 3 is an illustrative sequence diagram for rogue object detection, in accordance with example embodiments of the disclosure.

FIG. 3 is an illustrative sequence diagram 300 of an example rogue object detection sequence for detecting a rogue object, in accordance with example embodiments of the disclosure. A processor in a PTU (e.g., PTU 305) may establish a dynamic update interval with at least one PRU (e.g., PRUs 307, 309, and 311) by sending and receiving BLE messages to and from the at least one PRU. In particular, the processor in the PTU may establish a dynamic update interval that may repeat at least two times. For example, in some embodiments, and as shown in FIG. 3, the processor may determine two dynamic update intervals that may last a predetermined length of time (e.g., $t_{DYNAMIC}$ 301 and $t_{DYNAMIC}$ 303). In some embodiments, $t_{DYNAMIC}$ 301 may be equal to $t_{DYNAMIC}$ 303. For example, the length of time of the two dynamic update intervals may be equal to 250 milliseconds. In other embodiments, the length of time of the dynamic update intervals may not be the same. That is, $t_{DYNAMIC}$ 301 may not be equal to $t_{DYNAMIC}$ 303. During the dynamic update intervals, the processor may set a PTU timer (e.g., timer 334 and timer 368) corresponding to a period of time after a first BLE time synchronization message (e.g., BLE $t_1$ 302 and BLE $t_1$ 320) may be transmitted to a PRU (e.g., PRU 307). The first time synchronization BLE message may comprise a plurality of fields, as explained below in FIG. 4, one of which may be an octet in length and may comprise a first timer value (e.g., $t_1$) associated with a timer that a PRU (e.g., PRU 307) may set before determining an electrical measurement (e.g., voltage and/or current) of an amount of energy transferred to a battery (e.g., the battery 176) in the PRU from the PRU 307. The PTU timer may be a length of time the processor may wait before determining a rogue object detection (ROD) calculation (e.g., ROD 336 or ROD 370). The ROD calculation may be based at least in part on a comparison of an electrical measurement (e.g., voltage and/or current) of an output of electrical energy to the coils on the PTU (e.g., coils 202, 204, and 206) and the electrical energy consumed by the batteries in the PRUs (e.g., mobile phones 202a, 204a, and 206a). In some embodiments, the ROD 336 or ROD 370 may be based at least in part on the electrical measurement made in a previous dynamic update interval. For example, the ROD 370 may be based at least in part on $meas_0$ 332 and an aggregate of $meas_1$ 344, $meas_2$ 352, and $meas_3$ 360. And ROD 336 may be based at least in part on a first measurement $meas_0$ (not shown) and an aggregate of measurements $meas_1$, $meas_2$, and $meas_3$ (not shown) from a previous dynamic update interval corresponding to the PRUs 307, 309, and 311. The first measurement $meas_0$ and the aggregate of measurements $meas_1$, $meas_2$, and $meas_3$ may comprise one or more fields comprising electrical measurement data including, but not limited to, voltage and/or current measurement data. In some embodiments, power (real and/or reactive) measurement data may be included in the BLE measurement response message. In other embodiments, amplitude, phase, and/or power factor measurement data associated with the current and/or voltage may be included in the BLE measurement response message.

In one embodiment, a processor in the PTU 305 may send a set of first time synchronization BLE messages (e.g., the BLE $t_1$ 302, the BLE $t_2$ 304, the BLE $t_3$ 306) to the PRUs 307, 309, and 311 during a first dynamic update interval corresponding to a length of time of $t_{DYNAMIC}$ 301. The processor may send the BLE $t_1$ 302 at a time $t_1$ 302a, the BLE $t_2$ 304 at a time $t_2$ 304a, and the BLE $t_3$ 306 at a time $t_3$ 306a. The first time synchronization BLE messages may comprise a field that may be an octet in length and may comprise timer values (e.g., $t_1$, $t_2$, and $t_3$) associated with a timer that the PRUs (e.g., the PRUs 307, 309, and 311) may set before determining an electrical measurement (e.g., voltage and/or current) of an amount of energy transferred to a battery (e.g., the battery 176) in the PRUs. In some embodiments, the electrical measurements (e.g., $meas_1$ 344, $meas_2$ 352, and $meas_3$ 360) may occur after the timer $t_1$ 342, the timer $t_2$ 350, and the timer $t_3$ 358 elapse. The time $t_1$ 302a may occur before the time $t_2$ 304a, which may occur before the time $t_3$ 306a. This may be represented by the following relationship $\tau_1$ 302a<$\tau_2$ 304a<$\tau_3$ 306a. In some embodiments, this relationship may remain constant for all later dynamic update intervals. That is the time $\tau_1$ 302a may occur before the time $\tau_2$ 304a, which may occur before the time $\tau_3$ 306a. The processor in the PTU 305 may send a set of second time synchronization BLE messages (e.g., the BLE $t_1$ 320, the BLE $t_2$ 322, the BLE $t_3$ 324) to the PRUs 307, 309, and 311 during a second dynamic update interval corresponding to a length of time of $t_{DYNAMIC}$ 303. The processor may send the BLE $t_1$ 320 at a time $\tau_1$ 320a, the BLE $t_2$ 322 at a time $\tau_2$ 322a, and the BLE $t_3$ 324 at a time $\tau_3$ 324a. The second time synchronization BLE messages may comprise a field that may be an octet in length and may comprise a timer value (e.g., $t_1$, $t_2$, and $t_3$) associated with a timer that the PRUs (e.g., the PRUs 307, 309, and 311) may set before determining an electrical measurement (e.g., voltage and/or current) of an amount of energy transferred to a charging circuit (e.g., the battery 176) in the PRUs. In some embodiments, the electrical measurements (e.g., $meas_1$ 378, $meas_2$ 386, and $meas_3$ 394) may occur after the timer $t_1$ 376, the timer $t_2$ 384, and the timer $t_3$ 392 elapse.

After the processor in the PTU 305 transmits the set of first time synchronization BLE messages to the PRUs 307, 309, and 311, the PRUs may send a first acknowledgement message (e.g., the BLE ACK $t_1$ 338, the BLE ACK $t_2$ 346, and the BLE ACK $t_3$ 354) to the processor upon receipt of the first time synchronization BLE messages. In some embodiments, the PRUs 307, 309, and 311 may start the timers $t_1$ 342, $t_2$ 350, and $t_3$ 358 respectively upon receipt of the first time synchronization BLE messages. In other embodiments, the timers $t_1$ 342, $t_2$ 350, and $t_3$ 358 may be started when the acknowledgement messages are sent by the PRUs.

After the processor in the PTU 305 transmits the set of second time synchronization BLE messages to the PRUs 307, 309, and 311, the PRUs may send a second acknowledgement message (e.g., the BLE ACK $t_1$ 372, the BLE ACK $t_2$ 380, and the BLE ACK $t_3$ 388) to the processor upon receipt of the second set of time synchronization BLE messages. In some embodiments, the PRUs 307, 309, and 311 may start the timers $t_1$ 376, $t_2$ 384, and $t_3$ 392 respectively upon receipt of the second time synchronization BLE messages. In other embodiments, the timers $t_1$ 376, $t_2$ 384, and $t_3$ 392 may be started when the acknowledgement messages are sent by the PRUs.

In some embodiments, the processor in the PTU 305 may transmit a first BLE measurement message to the PRUs. For example, the processor may transmit the first BLE measurement messages BLE 308, BLE 310, and BLE 312 to the PRUs 307, 309, and 311 respectively. The processor may transmit a second one of the first BLE measurement messages (e.g., the BLE measurement message 310) in order for the processor to start the Timer $t_0$ 330. The first BLE measurement messages may be requests from the processor to the PRUs for electrical measurement data (e.g., voltage and/or current data). The PRUs may respond to the first BLE measurement messages by transmitting a BLE measurement response message (e.g., BLE $m_1$ 340, BLE $m_2$ 348, and/or BLE $m_3$ 356) comprising one or more fields, one of which may comprise electrical measurement data including voltage and/or current measurement data. In some embodiments, power (real and/or reactive) measurement data may be included in the BLE measurement response message. In other embodiments, amplitude, phase, and/or power factor measurement data associated with the current and/or voltage may be included in the BLE measurement response message. The BLE measurement response messages BLE $m_1$ 340, BLE $m_2$ 348, and/or BLE $m_3$ 356 may comprise electrical measurement data determined by the PRUs in a previous dynamic update interval (not shown). There may be a previous dynamic update interval during which the PRUs 307, 309, and 311 may determine electrical measurements $meas_1$, $meas_2$, $meas_3$ (not shown). The electrical measurements $meas_1$ 344, $meas_2$ 352, and $meas_3$ 360 may be transmitted by the PRUs in the BLE measurement response messages BLE $m_1$ 374, BLE $m_2$ 382, and BLE $m_3$ 390 respectively. The difference in time between when the PRUs send the first acknowledgement message and send the BLE measurement response message may be equal to a first BLE communication interval. In some embodiments, the first BLE communication interval may be different for different PRUs. For example, in some embodiments, the first BLE communication interval for the PRU 307 may be equal to $t_{BLE\_Comm\_Interval}$ 313, and the first BLE communication interval for the PRU 309 may be less than $t_{BLE\_Comm\_Interval}$ 313, and the first BLE communication interval for the PRU 311 may be less than the first BLE communication interval for the PRU 309. In other embodiments, the first BLE communication intervals for the PRUs may be equal. The timer $t_0$ 330 may be equal to the difference between the timer $t_1$ 342 and $t_{BLE\_Comm\_Interval}$ 313. That is, the timer $t_0$ 330 may be equal to the timer $t_1$ 342−$t_{BLE\_Comm\_Interval}$ 313. In some embodiments, the processor may use the relationship $t_k = t_1 302a - (\tau_k - \tau_1 302a)$ for k=1, 2, 3 to determine timers $t_1$ 342, $t_2$ 350, and $t_3$ 358.

The processor may transmit a second BLE measurement message to the PRUs. For example, the processor may transmit the second BLE measurement messages BLE 326, BLE 328, and BLE 362 to the PRUs 307, 309, and 311 respectively. As the processor transmits a second one of the second BLE measurement messages (e.g., the BLE measurement message 328), the processor may start the timer $t_0$ 364. The second BLE measurement messages may be requests from the processor to the PRUs for electrical measurement data (e.g., voltage and/or current data). The PRUs may respond to the second BLE measurement messages by transmitting a BLE measurement response message (e.g., BLE $m_1$ 374, BLE $m_2$ 382, and BLE $m_3$ 390) comprising one or more fields, one of which may comprise electrical measurement data including voltage and/or current measurement data. In some embodiments, power (real and/or reactive) measurement data may be included in the BLE measurement response message. In other embodiments, amplitude, phase, and/or power factor measurement data associated with the current and/or voltage may be included in the BLE measurement response message. The BLE measurement response messages BLE $m_1$ 374, BLE $m_2$ 382, and BLE $m_3$ 390 may comprise electrical measurement data (e.g., $meas_1$ 344, $meas_2$ 352, and $meas_3$ 360) determined by the PRUs in the first dynamic update interval. The difference in time between when the PRUs send the second acknowledgement message and send the BLE measurement response message may be equal to a second BLE communication interval. In some embodiments, the second BLE communication interval may be different for different PRUs. For example, in some embodiments, the second BLE communication interval for the PRU 307 may be equal to $t_{BLE\_Comm\_Interval}$ 313, and the second BLE communication interval for the PRU 309 may be less than $t_{BLE\_Comm\_Interval}$ 313, and the second BLE communication interval for the PRU 311 may be less than the second BLE communication interval for the PRU 309. In other embodiments, the second BLE communication intervals for the PRUs may be equal. The timer $t_0$ 364 may be equal to the difference between the timer $t_1$ 376 and $t_{BLE\_Comm\_Interval}$ 315. That is, the timer $t_0$ 364 may be equal to the timer $t_1$ 376−$t_{BLE\_Comm\_Interval}$ 315. In some embodiments, the processor may use the relationship $t_k = t_1 320a - (\tau_k - \tau_1 320a)$ for k=1, 2, 3 to determine timers $t_1$ 376, $t_2$ 384, and $t_3$ 392.

The electrical measurement data (e.g., $meas_1$ 378, $meas_2$ 386, and $meas_3$ 394) may be sent by the PRUs 307, 309, and 311 respectively to the processor in the PTU 305, in a third or subsequent dynamic update interval wherein the electrical measurement data may be sent in a subsequent BLE measurement response message. The electrical measurement data $meas_0$ 366 may be used in a subsequent dynamic update interval by the processor in the PTU 305 to determine a subsequent ROD calculation (not shown). The subsequent ROD calculation may be based at least in part on the electrical measurement data $meas_0$ 366 and an aggregate of the electrical measurement data $meas_1$ 378, $meas_2$ 386, and $meas_3$ 394.

FIG. 4 is an illustrative timer field, in accordance with example embodiments of the disclosure. A memory in a PTU may store in an array a table comprising one or more columns and rows similar to that of table 400. The table 400 may comprise fields that a processor in the PTU may use to set certain parameter values in the PTU and/or PRU. For example, row 402 may correspond to a field that the processor may read from the memory that turns the PTU on (e.g., comprises instructions which when executed by the processor turn one or more coils in the PTU on). The field may be 1 octet in length, and the description may be an indication that the PTU is on. This may be a mandatory field, and there may be no units associated with it.

Row 404 may correspond to a permission field that may be 1 octet in length and may determine whether or not a PRU has permission to be charged by one or more of the coils on the PTU. This may be a mandatory field, and there may be no units associated with it.

Row 406 may correspond to a time set field that may correspond to a universal time (clock) that the processor in the PTU and the processors in the PRUs may set as a time when BLE communications and electrical measurements may occur. It may be 1 octet in length. The field may be mandatory and may be measured in units of microseconds.

Row 408 may comprise a timer value for the PTU and the PRU to synchronize time (clocks), and it may be 1 octet in length. It may be mandatory and may be measured in units of microseconds.

Row 410 may comprise a field RFU that the processor in the PTU may use to send electrical measurement requests to the PRU.

Figure 5:
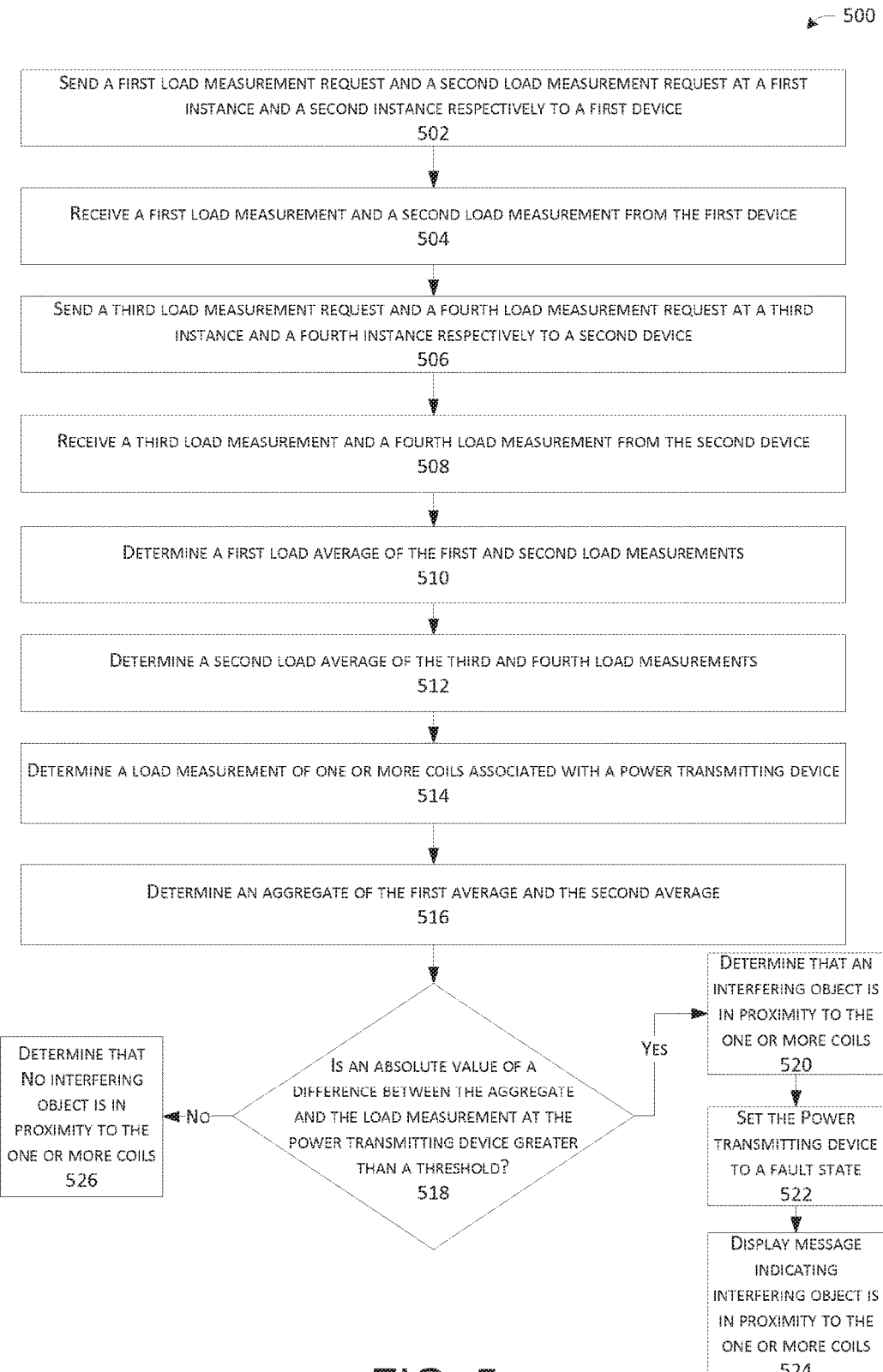
FIG. 5 is a flow diagram illustrating an example dataflow for the illustrative sequence diagram of FIG. 3, in accordance with certain example embodiments of the disclosure.

FIG. 5 is a flow diagram illustrating an example dataflow 500 for the illustrative sequence diagram of FIG. 3, in accordance with certain example embodiments of the disclosure.

At block 502, a processor in a PTU (e.g., the PTU 305 in FIG. 3) may send a first load measurement request and a second load measurement request at a first instance and a second instance in time respectively to a first device (e.g., the PRU 307 in FIG. 3). For example, PTU 305 may need to determine load measurements of one or more PRUs that may be in proximity of the charging coils of the PTU 305. The load measurements received from the one or more PRUs may assist the PTU 305 in determining whether a rogue device is in proximity of the charging coils based on comparing the load measurements at the one or more PRUs and an electric load at the PTU. The one or more PRUs may be associated with the PTU. For example, the one or more PRUs and the PTU may perform a handshake procedure in order to establish communication. The handshake procedure may exchange data between the one or more PRUs and the PTU in order to determine, at least in part, a device attempting to wirelessly charge (e.g., couple electromagnetically) using the PTU. In the case of a rogue device (e.g., a device not associated with the PTU), attempting to wirelessly charge using the PTU, the PTU may determine that the rogue device is present and may perform additional actions to stop the rogue device from wirelessly charging.

At block 504, the processor may receive a first load measurement and a second load measurement from the PRU. In some embodiments, the first and second load measurements may comprise electrical measurement data including voltage and/or current measurement data. In some embodiments, power (real and/or reactive) measurement data may be included. In other embodiments, amplitude, phase, and/or power factor measurement data associated with the current and/or voltage may be included in the first and second load measurement data.

At block 506, the processor may cause to send a third load measurement request and a fourth load measurement request at a third instance and a fourth instance, respectively, to a second device (e.g., the PRU 309). In some embodiments, the third and fourth load measurements may comprise the same electrical measurement data included in the first and second load measurements. In other embodiments, the third and fourth load measurements may be different than the first and second load measurements. The processor may cause to send a fifth, sixth, seventh, etc., load measurement request to reduce the amount of noise that may be introduced by a device, comprising one or more non-linear and/or switching circuits. Non-linear and/or switching circuits may consume electric energy at drastically different levels within a short amount of time. For example, during a period of time equal to 250 milliseconds, a PRU (e.g., a mobile phone or tablet) comprising one or more non-linear and/or switching circuits may consume a first amount of electric energy at a first instance in time and a second amount of electric energy at a second instance in time wherein the difference between the first and second instances in time is significantly greater than zero. Accordingly, the processor may correctly determine that the PRU is electromagnetically coupled to the PTU at the first instance in time and incorrectly determine that it has been electromagnetically uncoupled at the second instance in time. Therefore, the processor may send repeated measurement requests to determine whether a change in the amount of electric energy consumed by the PRU is not because the PRU has been uncoupled, but rather because of the electronics (e.g., non-linear and/or switching circuits) and/or the applications running on the PRU over a period of time (e.g., between the first and second instances in time). The processor may determine an electric energy consumption profile by averaging the amount of electric energy consumed by collecting multiple load measurements (e.g., 25 measurements) corresponding to the amount of electric energy consumed by the PRU within an interval. The electric energy consumption profile (e.g., average amount of electric energy consumed over an interval) may be used by the processor to determine if the PRU is uncoupled or coupled. The details of the averaging process are explained below.

At block 508, the processor may receive a third load measurement and a fourth load measurement from the second device comprising the electrical measurement data.

At block 510, the processor may then determine a first load average of the first and second load measurements based at least in part on the first and second load measurements from the first device. The PTU may receive multiple load measurements from the one or more PRUs and may average the measurements received at various times. This may minimize any errors during load measurements taken at the one or more PRUs. In this case, the PTU may be able to more accurately determine the presence of a rogue device based on the load measurements received from the one or more PRUs.

At block 512, the processor may determine a second load average based at least in part on the third and fourth load measurements. The higher the number of measurements taken within an interval, the higher the accuracy of the actual load measurement at the one or more PRUs. For example, if the PTU and the one or more PRUs make a large number of measurements within the interval, for example 25 measurements, then it may be easier for the PTU to determine that a rogue device may be present in the proximity of the PTU's coils.

At block 514, the processor may determine a load measurement of one or more coils associated with the power transmitting device (e.g., the PTU 305). The load measurement of the one or more coils may be similar to the electrical measurements mentioned above. The PTU 305 may also measure the load requirement at its coils in order to compare that load requirement to the load requirements received from the one or more PRUs at various times.

At block 516, the processor may determine an aggregate of the first average and the second average. The processor may determine the first and second averages so that the processor may determine if a PRU is electromagnetically uncoupled or if the PRU comprises non-linear and/or switching circuits that may consume electric energy at varying amounts at varying times thereby leading the processor to mistakenly determine that the PRU is electromagnetically uncoupled from the PTU. In some embodiments, the aggregate of the first average may be an aggregate of measurements taken by the processor to determine how much electric energy the PTU is delivering to the one or more coils. The aggregate of the second average may be an aggregate of measurements taken by a processor in each PRU electromagnetically coupled to the PTU. The processor in the PTU may average each measurement per PRU over the number of measurements received from the PRUs as explained below at block 518.

At block 518, the processor may determine if an absolute value of a difference between the aggregate and the load measurement at the power transmitting device is greater than a threshold. If the absolute value of the difference is not greater than the threshold, the processor may determine that there is no interfering object in proximity to the one or more coils (block 526). If the absolute value of the difference is greater than the threshold, the processor may determine that there is an interfering object in proximity to the one or more coils (block 520). The processor may set the power transmitting device to a fault state in block 522 and display a message indicating that there is an interfering object in proximity to the one or more coils in block 524.

Figure 6:
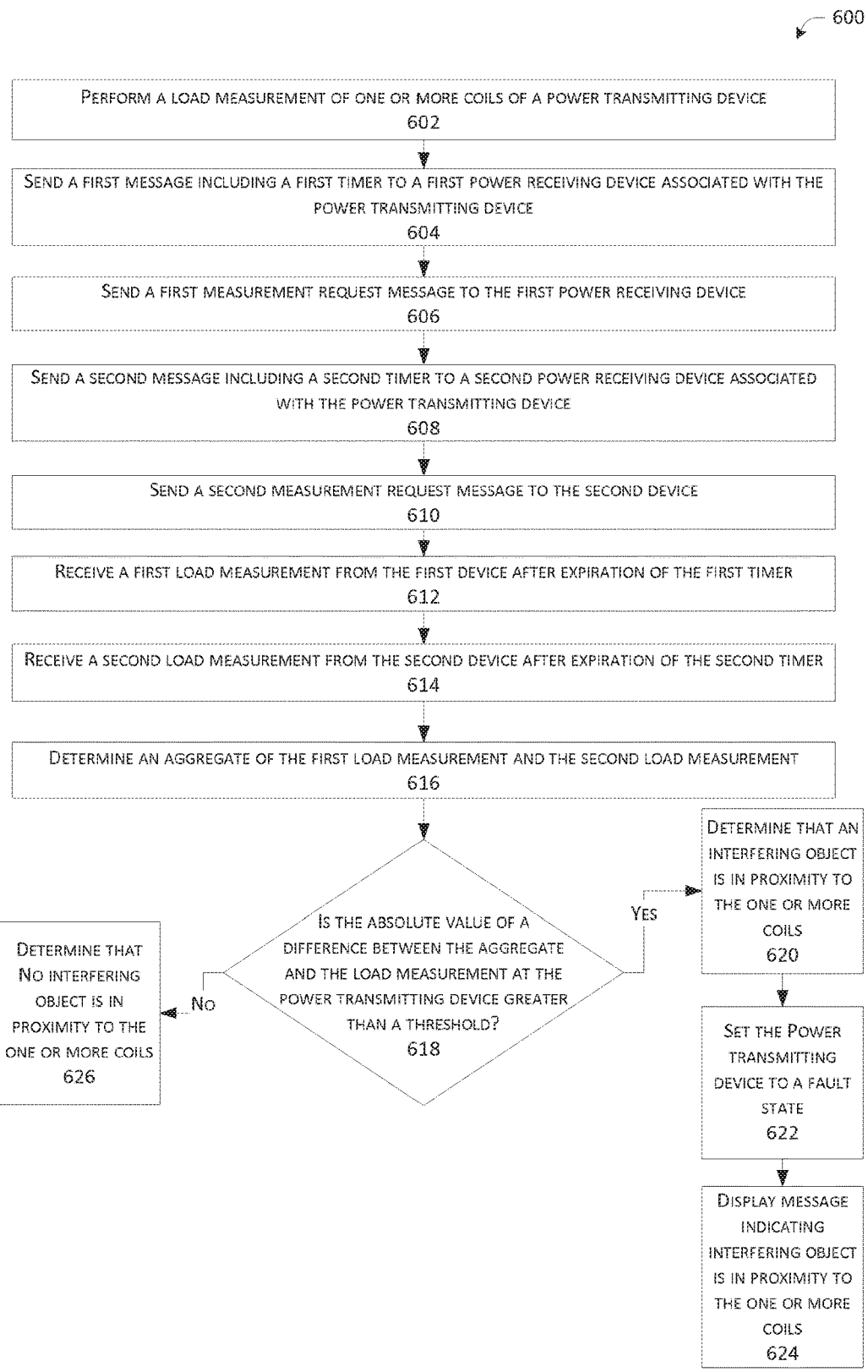
FIG. 6 is a flow diagram illustrating an example dataflow for the illustrative sequence diagram of FIG. 3, in accordance with certain example embodiments of the disclosure.

FIG. 6 is a flow diagram illustrating an example dataflow 600 for the illustrative sequence diagram of FIG. 3, in accordance with certain example embodiments of the disclosure.

At block 602, a processor in a PTU (e.g., the PTU 305) may perform a load measurement of one or more coils of a power transmitting device (e.g., the PTU 305). For example, the processor may perform a load measurement of the coils 202, 204, and 206. The load measurement of the one or more coils may comprise electrical measurement data including voltage and/or current measurement data. In some embodiments, power (real and/or reactive) measurement data may be included. In other embodiments, amplitude, phase, and/or power factor measurement data associated with the current and/or voltage may be included.

At block 604, the processor may send a first message (e.g., the BLE $t_1$ 302) including a first timer (e.g., the timer $t_1$ 342) to a first power receiving device (e.g., the PRU 307) associated with the power transmitting device. In some embodiments, this message may be sent to the first power receiving device using the same electromagnetic energy that may be used to charge the first power receiving device. For example, a coil (e.g., coil 204) on a PTU may have a PRU (e.g., mobile phone 204a) electromagnetically coupled to it, and may send the first message through the coil to a receiving coil on the PRU using an electromagnetic waveform while the PRU is charging. The processor in the PRU may charge the PRU by using the receiving coil, and to receive and/or send messages from and/or to the processor in the PTU.

At block 606, the processor may send a first measurement request message (e.g., the BLE 308) to the first power receiving device. For example, the processor in the PTU 305 may send the BLE 308 to the PRU 307. For example, the PTU 305 may need to determine the load measurements of one or more PRUs that may be in proximity of the charging coils of the PTU 305. The load measurements received from the one or more PRUs may assist the PTU 305 to determine whether a rogue device is in proximity of the charging coils based on comparing the load measurements at the one or more PRUs and an electric load that is supported at the PTU. The one or more PRUs may be associated with the PTU. For example, the one or more PRUs and the PTU may perform a handshake procedure in order to establish communication. The handshake procedure may exchange data between the one or more PRUs and the PTU in order to determine, at least in part, a device attempting to wirelessly charge (e.g., couple electromagnetically) using the PTU. In the case of a rogue device (e.g., a device not associated with the PTU) attempting to wirelessly charge using the PTU, the PTU may determine that the rogue device is present and may perform additional actions to stop the rogue device from wirelessly charging.

The processor may send a second message (e.g., the BLE $t_2$ 304) including a second timer (e.g., the timer $t_2$350) to a second power receiving device (e.g., the PRU 309) associated with the power transmitting device at block 608.

The processor may then send a second measurement request message (e.g., the BLE 310) to the second device (block 610). In some embodiments, the second measurement request message may be different from the first measurement request message. For example, the first measurement request message may request real power measurements from the first device, whereas the second measurement request message may request reactive power measurements from the second device.

The processor may then progress to block 612 and receive a first load measurement (e.g., the BLE $m_1$ 374) from the first device after expiration of the first timer (e.g., the timer $t_1$ 342). The length of the timer value may be based at least in part on the order in which the processor sends the BLE measurement requests. For example, the timer $t_1$ may be greater than the timer $t_2$ because the PRU 307 may have been the first device to pair with the PTU 305, and therefore a greater amount of time may be allocated to the PRU 307.

The processor may receive a second load measurement (e.g., the BLE $m_2$ 382) from the second device after expiration of the second timer (e.g., the timer $t_2$ 350) in block 614. The length of the timer value may be based at least in part on the order in which the processor sends the BLE measurement requests. For example, the timer $t_2$ may be greater than the Timer $t_3$ because the PRU 309 may have been the second device to pair with the PTU 305, and therefore a greater amount of time may be allocated to the PRU 309.

At block 616, the processor may determine an aggregate of the first load measurement and the second load measurement. The aggregate may be a sum of all measurements taken before the first and second timers expire respectively.

The processor may determine if an absolute value of a difference between the aggregate and the load measurement at the power transmitting device is greater than a threshold at block 618. The processor may determine the absolute value of the difference to determine if an amount of electric energy delivered to the coils of the PTU equals the amount of electric energy consumed by the PRUs electromagnetically coupled to the PTU.

If the absolute value of the difference is less than the threshold, the processor may determine no interfering object is in proximity to the one or more coils at block 626. The processor may determine a predefined threshold that it may use to determine if an interfering (e.g., rogue) object is in proximity of a coil in the PTU.

If the processor determines that the absolute value of the difference exceeds the threshold, the processor may determine that an interfering object is in proximity to the one or more coils at block 620.

If the processor progresses to block 620 it may switch the coil(s) closest to the interfering object into an inoperable state (e.g., fault state). That is, the processor may set the power transmitting device to a fault state at block 622.

After the processor sets the power transmitting device (PTU) to a fault state, the processor may display a message indicating an interfering object is in proximity to the one or more coils (block 624). The PTU may remain in this state until the user removes the interfering object, or removes and re-pairs the PRU closest to the PTU with the interfering object.

Figure 7:
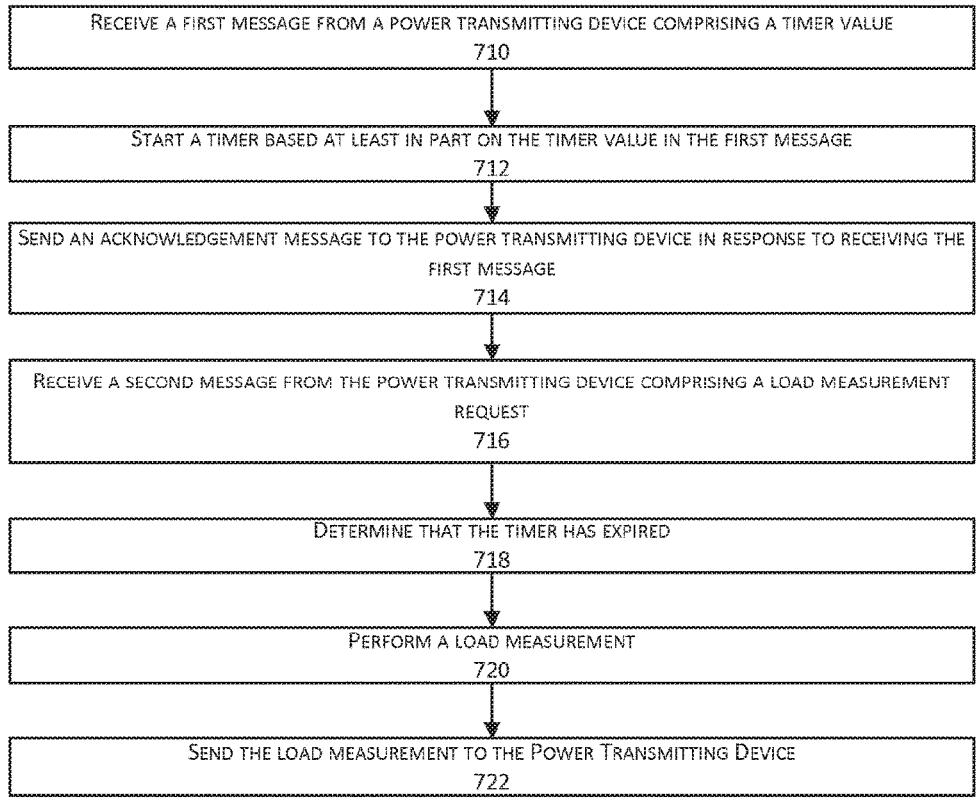
FIG. 7 is a flow diagram illustrating an example dataflow for the illustrative sequence diagram of FIG. 3, in accordance with certain example embodiments of the disclosure.

FIG. 7 is a flow diagram illustrating an example dataflow 700 for the illustrative sequence diagram of FIG. 3, in accordance with certain example embodiments of the disclosure. In block 710, a processor in a PRU (e.g., any of the PRUs 307, 309, or 311) may receive a first message (e.g., any of the BLE $t_1$ 302, BLE $t_2$ 304, or BLE $t_3$ 306 corresponding to the PRUs 307, 309, or 311) from a power transmitting device (e.g., the PTU 305) comprising a corresponding timer value (e.g., any of the timers $t_1$ 342, $t_2$ 350, or $t_3$ 358). The timer value may correspond to a time at which the processor may turn on a timer associated with when the processor may send an acknowledgement message to the power transmitting device. The timer value may also be the length of time the processor must wait before determining a measurement of the amount of electric energy received by the PRU from the PTU.

At block 712, the processor may start a timer based at least in part on the timer value in the first message. For example, in FIG. 3, any of the PRUs 307, 309, and 311 may start the timers $t_1$ 342, $t_2$ 350, and/or $t_3$ 358.

The processor may then send an acknowledgement message (e.g., any of the BLE ACK $t_1$ 338, the BLE ACK $t_2$ 346, and the BLE ACK $t_3$ 354) to the power transmitting device in response to receiving the first message at block 714. The acknowledgement message may be sent to the power transmitting device to verify that the processor received the first message and has turned on the timer.

The processor may then receive a second message (e.g., any of the BLE 308, 310, or 312) from the power transmitting device comprising a load measurement request at block 716. The load measurement request may be a request for a measurement of electric energy received by the PRU from the PTU. The measurements that may be included in the measurement request are included below at block 720.

At block 718, the processor may determine that the timer has expired. After the processor determines that the timer has expired, the processor may perform a load measurement at block 720. The load measurement may comprise electrical measurement data including voltage and/or current measurement data. In some embodiments, power (real and/or reactive) measurement data may be included. In other embodiments, amplitude, phase, and/or power factor measurement data associated with the current and/or voltage may be included.

At block 722, the processor may send the load measurement to the power transmitting device.

Certain aspects of the disclosure are described above with reference to block and flow diagrams of systems, methods, apparatuses, and/or computer program products according to various implementations. It will be understood that one or more blocks of the block diagrams and flow diagrams, and combinations of blocks in the block diagrams and the flow diagrams, respectively, may be implemented by computer-executable program instructions. Likewise, some blocks of the block diagrams and flow diagrams may not necessarily need to be performed in the order presented, or may not necessarily need to be performed at all, according to some implementations.

Accordingly, blocks of the block diagrams and flow diagrams support combinations of means for performing the specified functions, combinations of elements or steps for performing the specified functions and program instruction means for performing the specified functions. It will also be understood that each block of the block diagrams and flow diagrams, and combinations of blocks in the block diagrams and flow diagrams, may be implemented by special-purpose, hardware-based computer systems that perform the specified functions, elements or steps, or combinations of special-purpose hardware and computer instructions.

These computer-executable program instructions may be loaded onto a special-purpose computer or other particular machine, a processor, or other programmable data processing apparatus to produce a particular machine, such that the instructions that execute on the computer, processor, or other programmable data processing apparatus create means for implementing one or more functions specified in the flow diagram block or blocks. These computer program instructions may also be stored in a computer-readable storage media or memory that may direct a computer or other programmable data processing apparatus to function in a particular manner, such that the instructions stored in the computer-readable storage media produce an article of manufacture including instruction means that implement one or more functions specified in the flow diagram block or blocks. As an example, certain implementations may provide for a computer program product, comprising a computer-readable storage medium having a computer-readable program code or program instructions implemented therein, said computer-readable program code adapted to be executed to implement one or more functions specified in the flow diagram block or blocks. The computer program instructions may also be loaded onto a computer or other programmable data processing apparatus to cause a series of operational elements or steps to be performed on the computer or other programmable apparatus to produce a computer-implemented process such that the instructions that execute on the computer or other programmable apparatus provide elements or steps for implementing the functions specified in the flow diagram block or blocks.

In example embodiments of the disclosure, there may be a power transmitting device comprising: one or more coils; at least one memory that stores computer-executable instructions; and at least one processor configured to access the at least one memory, wherein the at least one processor is configured to execute the computer-executable instructions to: cause to send to a first device a first load measurement request at a first instance and a second load measurement request at a second instance; receive a first load measurement associated with the first load measurement request and a second load measurement associated with the second load measurement request; determine a first average measurement of the first load measurement and the second load measurement; cause to send to a second device a third load measurement request at a third instance and a fourth load measurement request at a fourth instance; receive a third load measurement associated with the third load measurement request and a fourth load measurement associated with the fourth load measurement request; determine a second average measurement of the third load measurement and the fourth load measurement; perform a load measurement of the one or more coils of the power transmitting device; and determine a presence of one or more rogue devices based at least in part on a comparison of the load measurement and an aggregate of the first average measurement and the second average measurement.

Implementations may include the following features. The power transmitting device may further comprise a transceiver configured to transmit and receive wireless signals. The power transmitting device may further comprise at least one antenna coupled to the transceiver, wherein the at least one antenna is configured to dissipate and detect electromagnetic energy associated with transmitting and receiving the wireless signals respectively. The computer-executable instructions may further configure the processor to determine a presence of one or more rogue devices. The computer-executable instructions may further configure the processor to determine whether a difference between the load measurement and the aggregate is greater than a predetermined threshold. In some embodiments, the load measurement may include at least in part a rectifier voltage measurement and a rectifier current measurement. In other embodiments, the first instance and the second instance may be within a predetermined interval allocated for sending a plurality of load measurement requests to one or more devices.

In some example embodiments of the disclosure, there may be a non-transitory computer-readable medium storing computer-executable instructions which, when executed by a processor, cause the processor to perform operations comprising: performing a load measurement of one or more coils of a power transmitting unit (PTU) after a timer expires; causing to send a first message including a first timer, to a first device of one or more devices associated with the PTU; causing to send a first measurement request message within a predetermined interval to the first device; causing to send a second message including a second timer, to a second device of the one or more devices associated with the PTU; causing to send a second measurement request message within the predetermined interval to the second device; receiving a first measurement response message including a first load measurement performed after the first timer expires; receiving a second measurement response message including a second load measurement performed after the second timer expires; and determining a presence of a rogue device based at least in part on the load measurement, the first load measurement and the second load measurement.

Implementations may include one or more of the following features. The non-transitory computer-readable medium may comprise instructions that further configure the processor to perform operations of: determining the presence of the rogue device based at least in part on a rogue object detection (ROD) calculation performed after receiving the first measurement response message and the second measurement response message. The ROD calculation may include, at least in part, comparing the load measurement to an aggregate of the first load measurement and the second load measurement. The non-transitory computer-readable medium may comprise instructions that further configure the processor to perform operations of: determining whether a difference between the load measurement and an aggregate of the first load measurement and the second load measurement is within a predetermined threshold. In some embodiments, the first timer and the second timer may be synchronized. In other embodiments, the first load measurement may be an average of one or more load measurements performed at the first device after the first timer expires.

In example embodiments, there may be a power receiving device comprising: one or more coils; at least one memory that stores computer-executable instructions; and at least one processor configured to access the at least one memory, wherein the at least one processor is configured to execute the computer-executable instructions to: receive a request from a power transmitting device to perform load measurement at the one or more coils; perform the load measurement after a first timer expires; and cause to send the load measurement to the power transmitting device.

In some embodiments, the power receiving device may further comprise a transceiver configured to transmit and receive wireless signals. The power receiving device may further comprise at least one antenna coupled to the transceiver, wherein the at least one antenna is configured to dissipate and detect electromagnetic energy associated with transmitting and receiving the wireless signals respectively.

In some embodiments, the load measurement may include at least in part a rectifier voltage measurement and a rectifier current measurement associated with the power receiving device. The at least one processor may be further configured to execute the computer-executable instructions to: identify a first message from the power transmitting device including a value of the first timer, and cause to send an acknowledgment message in response to identifying the first message.

In some embodiments, the at least one processor may be further configured to execute the computer-executable instructions to: cause to send the load measurements within a predetermined interval. In other embodiments, the predetermined interval may be a Bluetooth low energy (BLE) communication interval. In some embodiments, the load measurement may be an average of one or more load measurements performed at the power receiving device after the first timer expires.

Conditional language, such as among others, "can," "could," "might," or "may," unless specifically stated otherwise, or otherwise understood within the context as used, is generally intended to convey that certain implementations could include, while other implementations do not include, certain features, elements, and/or operations. Thus, such conditional language is not generally intended to imply that features, elements, and/or operations are in any way required for one or more implementations or that one or more implementations necessarily include logic for deciding, with or without user input or prompting, whether these features, elements, and/or operations are included or are to be performed in any particular implementation.

Many modifications and other implementations of the disclosure set forth herein will be apparent having the benefit of the teachings presented in the foregoing descriptions and the associated drawings. Therefore, it is to be understood that the disclosure is not to be limited to the specific implementations disclosed and that modifications and other implementations are intended to be included within the scope of the appended claims. Although specific terms are employed herein, they are used in a generic and descriptive sense only and not for purposes of limitation.

What is claimed is:

1. A power transmitting device comprising:
   one or more coils;
   at least one memory that stores computer-executable instructions; and
   at least one processor configured to access the at least one memory, wherein the at least one processor is configured to execute the computer-executable instructions to:
      cause to send to a first device a first load measurement request at a first instance and a second load measurement request at a second instance;
      receive a first load measurement associated with the first load measurement request and a second load measurement associated with the second load measurement request;
      determine a first average measurement of the first load measurement and the second load measurement;
      cause to send to a second device a third load measurement request at a third instance and a fourth load measurement request at a fourth instance;
      receive a third load measurement associated with the third load measurement request and a fourth load measurement associated with the fourth load measurement request;
      determine a second average measurement of the third load measurement and the fourth load measurement;
      perform a load measurement of the one or more coils of the power transmitting device; and
      determine a presence of one or more rogue devices based at least in part on a comparison of the load measurement and an aggregate of the first average measurement and the second average measurement.

2. The power transmitting device of claim 1, further comprising a transceiver configured to transmit and receive wireless signals.

3. The power transmitting device of claim 2, further comprising at least one antenna coupled to the transceiver, wherein the at least one antenna is configured to dissipate and detect electromagnetic energy associated with transmitting and receiving the wireless signals respectively.

4. The power transmitting device of claim 1, wherein the computer-executable instructions, to determine a presence of one or more rogue devices, further include computer-executable instructions to determine whether a difference between the load measurement and the aggregate is greater than a predetermined threshold.

5. The power transmitting device of claim 1, wherein the load measurement includes at least in part a rectifier voltage measurement and a rectifier current measurement.

6. The power transmitting device of claim 1, wherein the first instance and the second instance are within a predetermined interval allocated for sending a plurality of load measurement requests to one or more devices.

7. A non-transitory computer-readable medium storing computer-executable instructions which, when executed by a processor, cause the processor to perform operations comprising:
- performing a load measurement of one or more coils of a power transmitting unit (PTU) after a timer expires;
- causing to send a first message including a first timer, to a first device of one or more devices associated with the PTU;
- causing to send a first measurement request message within a predetermined interval to the first device;
- causing to send a second message including a second timer, to a second device of the one or more devices associated with the PTU;
- causing to send a second measurement request message within the predetermined interval to the second device;
- receiving a first measurement response message including a first load measurement performed after the first timer expires;
- receiving a second measurement response message including a second load measurement performed after the second timer expires; and
- determining a presence of a rogue device based at least in part on the load measurement, the first load measurement and the second load measurement.

8. The non-transitory computer-readable medium of claim 7, wherein the operations further comprise:
- determining the presence of the rogue device based at least in part on a rogue object detection (ROD) calculation performed after receiving the first measurement response message and the second measurement response message.

9. The non-transitory computer-readable medium of claim 8, wherein the ROD calculation includes, at least in part, comparing the load measurement to an aggregate of the first load measurement and the second load measurement.

10. The non-transitory computer-readable medium of claim 7, wherein the operations further comprise:
- determining whether a difference between the load measurement and an aggregate of the first load measurement and the second load measurement is within a predetermined threshold.

11. The non-transitory computer-readable medium of claim 7, wherein the first timer and the second timer are synchronized.

12. The non-transitory computer-readable medium of claim 7, wherein the first load measurement is an average of one or more load measurements performed at the first device after the first timer expires.

* * * * *